United States Patent
Milleker et al.

(10) Patent No.: US 7,647,260 B2
(45) Date of Patent: Jan. 12, 2010

(54) RETURN ON INVESTMENT (ROI) TOOL

(75) Inventors: William N. Milleker, Riverside, IL (US); Eric V. Aiken, McDonough, GA (US); John K. Kalita, Marietta, GA (US); Brooks B. Finnegan, Atlanta, GA (US)

(73) Assignee: Accenture Global Services GmbH (CH)

( * ) Notice: Subject to any disclaimer, the term of this patent is extended or adjusted under 35 U.S.C. 154(b) by 1019 days.

(21) Appl. No.: 10/936,817

(22) Filed: Sep. 9, 2004
(Under 37 CFR 1.47)

(65) Prior Publication Data

US 2006/0053072 A1    Mar. 9, 2006

(51) Int. Cl.
*G06Q 40/00* (2006.01)
(52) U.S. Cl. .................................. 705/35
(58) Field of Classification Search .......... 705/35
See application file for complete search history.

(56) References Cited

U.S. PATENT DOCUMENTS

| | | | |
|---|---|---|---|
| 6,963,853 B1* | 11/2005 | Smith | 705/36 R |
| 2003/0177060 A1* | 9/2003 | Seagraves | 705/11 |
| 2004/0010459 A1* | 1/2004 | Zatlukal | 705/36 |
| 2004/0078310 A1* | 4/2004 | Shaffer | 705/35 |
| 2004/0167788 A1* | 8/2004 | Birimisa et al. | 705/1 |
| 2004/0225583 A1* | 11/2004 | Joodi | 705/35 |
| 2004/0236617 A1* | 11/2004 | Ebert | 705/7 |
| 2005/0033607 A1* | 2/2005 | Georgiou et al. | 705/2 |
| 2005/0137950 A1* | 6/2005 | Palozzi et al. | 705/35 |
| 2005/0149422 A1* | 7/2005 | Van Lier | 705/36 |
| 2005/0154654 A1* | 7/2005 | Berstis et al. | 705/30 |

* cited by examiner

*Primary Examiner*—Jagdish N Patel
*Assistant Examiner*—Sara Chandler
(74) *Attorney, Agent, or Firm*—Finnegan, Henderson, Farabow, Garrett & Dunner LLP

(57) ABSTRACT

The present invention provides a system and related method that enables a user to use one or more appropriate ROI tools according to the needs of the users. Specifically, the user provides data related to the organizations and technical expenditures, and this information is used to determine an applicable set of ROI tools. The inputted data is then provided to the applicable ROI tools for automatically examining a company's financial data, and using this evaluation to assess the desirability of technology expenditures.

21 Claims, 5 Drawing Sheets

RETURN ON INVESTMENT (ROI) TOOL

CROSS-REFERENCE TO RELATED APPLICATIONS

Not applicable.

STATEMENT REGARDING SPONSORED RESEARCH OR DEVELOPMENT

Not applicable.

REFERENCE TO SEQUENCE LISTING

Not applicable.

BACKGROUND OF THE INVENTION

1. Field of the Invention

The present invention relates to computerized system and method that automatically integrates the operation of multiple ROI tools to evaluate the cost and benefits of a technology purchase.

2. Background of the Invention

Several known tools are used to evaluate the desirability of technology expenditures. For example, various known return of investments (ROI) tools measure the cost benefits of the technology expenditure. For example, a technology expenditure may result in increase worker productivity in exchange for various purchase and maintenance costs, and the ROI tool attempts to quantify these costs and benefits.

For a given use of money in an enterprise, the ROI represents how much profit or cost saving is realized. An ROI calculation is sometimes used along with other approaches to develop a business case for a given proposal, and this business case operates as a template for achieving the predicted net benefits. The overall ROI for an enterprise is sometimes used as a way to grade how well a company is managed. If an enterprise has immediate objectives of getting market revenue share, building infrastructure, positioning itself for sale, or other objectives, ROI might be measured in terms of meeting one or more of these objectives rather than in immediate profit or cost saving.

Several methods have been used to measure the benefits of technology expenditures. Typically, an auditing approach has been used to document the potential savings. This approach usually involves a "picture in time" type of measurement study where functions are looked at in detail with the potential savings estimated. The studies tend to be organizationally focused meticulously detailing the potential savings throughout an organization. Once the snapshot has been taken, the study tends to become a reference document. While taking an audit or a snapshot in time can help to scope the size of savings possible with a technology acquisition, the organization is left with little understanding on how this change is to come about.

One issue implicit in the ROI approach is that the measurement metrics are based on specific industry standards. It is relatively easy in private industry to develop a set of metrics that can be used to measure the potential payoff from a technology acquisition. For example, a business can focus on inventory costs, look at how many millions of dollars that they can reduce their inventory investment by, value these savings at their cost of capital, create a measure and a target for the savings that they can attribute to the technology acquisition. In doing so, their target can be based on a range of metrics already available within their industry from similar firms doing similar things. Thus they can easily look to existing metrics and targets on which to base their change strategy and programs.

Various known ROI tools exists to assess technology expenditures. As suggested above, these ROI tools are often particularly adapted for use in by a particular organization or industry because the cost-benefit analysis depends on various assumptions. Furthermore, different ROI tools are developed for different types of products, and the ROI for each type of product is particularly adapted to address the costs and benefits of the particular product. Accordingly, it can be seen that a customized ROI tool is ideally created for each organization and each proposed purchase. However, the creation of an ROI tool is a relatively cost and labor intensive process that requires detailed studies of the purchaser and the product. Accordingly, there exists a current need for an ROI tool that is more robust and is able to handle a variety of different organizations and purchases. Specifically, there exists a need for technology that enable the use of existing ROI tools in a variety of different situations, thereby limiting the costs of perform the ROI analysis.

As stated above, the known ROI tools are particularly configured for particular products because theses tools address the particular costs and benefits of these products. When a technology purchase comprises a group of products (e.g., combinations of hardware and software), the ROI case study becomes much more difficult. Merely summing together the results of the ROI tools for the individual products often does not work since costs and benefits may be conflicting (e.g., a cost of one product may limit gains from another product). Accordingly, there exists a need for an ROI tool that easily calculates the costs and benefits for multiple products, and a tool that evaluates technology expenditures in view of an organization's various business needs.

SUMMARY OF THE INVENTION

In response to these and other needs, the present invention provides a system and related method that enables a user to use one or more appropriate ROI tools according to the needs of the users. Specifically, the user provides data related to the organizations and technical expenditures, and this information is used to determine an applicable set of ROI tools. The inputted data is then provided to the applicable ROI tools for automatically examining a company's financial data, and using this evaluation to assess the desirability of technology expenditures. The selection of the applicable ROI tools and the combining of the results from the applicable ROI tools are generally performed according using predefined logic rules defined through previous studies. Optionally, the data is provided automatically through a database containing the organization's financial data.

BRIEF DESCRIPTION OF THE DRAWING

A more complete understanding of the present invention and advantages thereof may be acquired by referring to the following description taken in conjunction with the accompanying drawings in which like reference numbers indicate like features, and wherein.

DETAILED DESCRIPTION OF THE PREFERRED EMBODIMENTS

Figure 1A:
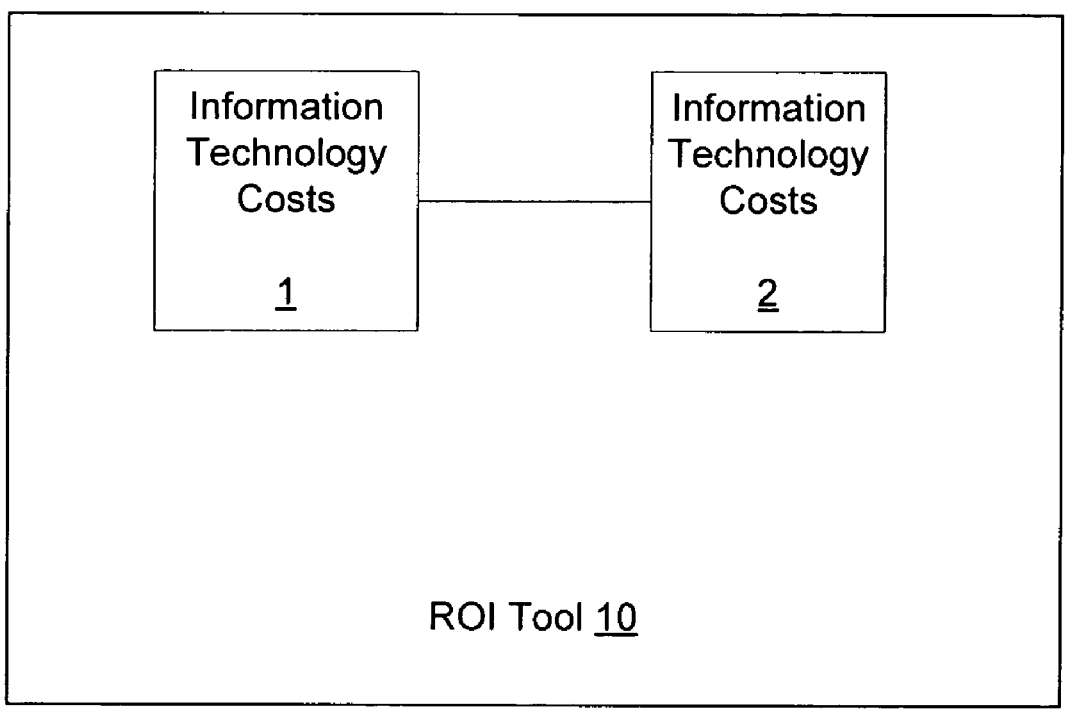
FIG. 1A (PRIOR ART) illustrates a known ROI tool.

As depicted in FIG. 1A (prior art), a known Return on Investment (ROI) tool 10 generally forms a snapshot that attempts to providing an accounting breakdown of the various costs 1 and benefits 2 from an information technology expenditure. For example, the changes caused by various technology expenditures may be studied and accessed, as described in co-owned pending U.S. application Ser. No. 10/609,690 filed on Mar. 18, 2004 the subject matter of which is incorporated by reference. The predicted changes may then be used to create a business case model showing the specific predicted costs and benefits of the technology expenditure.

One type of ROI tool 10 uses an auditing approach to document the potential savings to organizations. This approach usually involves a "picture in time" type of measurement study where functions are looked at in detail with the potential savings estimated. The studies tend to be organizationally focused meticulously detailing the potential savings throughout an organization. While taking an audit or a snapshot in time can help to scope the size of savings possible with a technology acquisition, the organization is left with little understanding on how this change is to come about. Unless there is a follow up program that helps transition and manage the change to realize the benefits, such studies simply become volumes that document a theoretical potential. Thus, unless the work is built on a framework that will allow the organization to implement and manage changes, little lasting value may have been done.

Figure 1B:
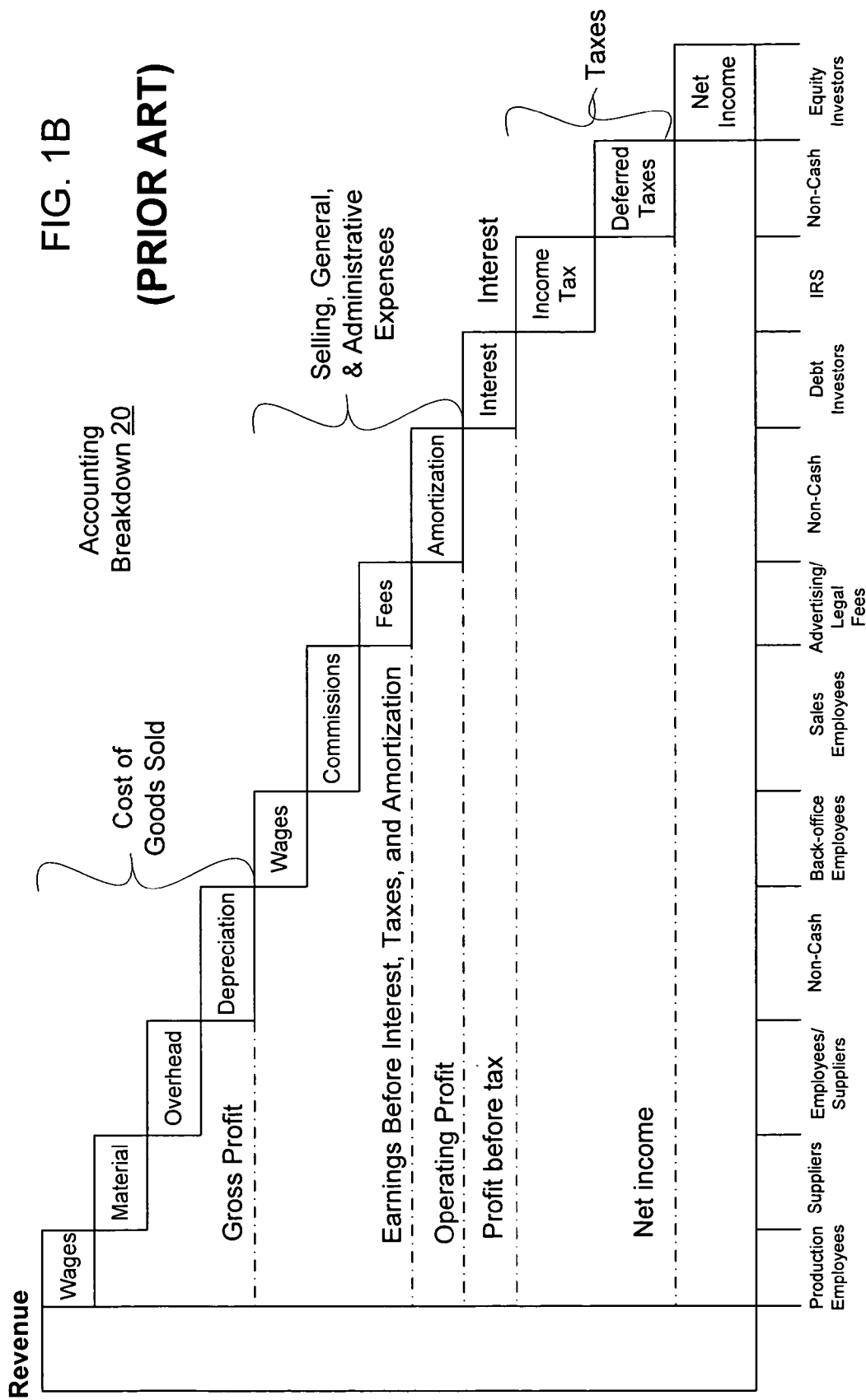
FIG. 1B (PRIOR ART) depicts an accounting breakdown produced by an ROI tool in FIG. 1A.

Turning now to FIG. 1B (prior art), the ROI tool 10 may create an accounting breakdown 20 to create a snapshot the depicts the effects of a technology expenditure on various accounting measures, such as various types of wages (reflecting productivity), types of fixed costs, taxes, etc. The net effects of the expenditure are then used to evaluate the desirability of the technology expenditure. The accounting breakdown, reflects the organizations position at a moment in time, and then estimates the changes to the organization's position as caused by the technology expenditure. Furthermore, the accounting breakdown 20 of the organization, as produced by the ROI tool 10, may be used as a business case model that serves as a blueprint to guide the organization to achieve the various predicted benefits from the technology expenditure. For example, productivity improvements cannot be achieved unless the organization adjust its workforce in view of the technology expenditure. It should be appreciated that while the accounting breakdown 20 of FIG. 1B presents large accounting categories, the ROI tool 10 may provide detail analysis addressing predicted to specific categories included in the large accounting categories, such as productivity of a particular type of employee.

The various calculations in the ROI tool 10 generally look to information in the company's accounting breakdown 20. The accounting breakdown 20 generally consist of a balance sheet, income statement, cash flow statement, and notes to the financial statements. Core Financial Statements contents include: Balance Sheet; Income Statement; Cash Flow Statement; and Notes to the Financial Statements.

A Balance Sheet is a snapshot at one point in time in the life of a business. The balance sheet represents the financial state of the company at that point in time. The one side of the accounting sheet represents the company's various assets, including:

- Current Assets such as Cash, Short-term investments (debt and equity securities), Accounts receivable, Inventory, and Prepaid accounts;
- Long-term Investments including debt and equity securities, and Investments in non-consolidated subsidiaries;
- Property, Plant & Equipment such as Land, Machinery & Equipment, Furniture & Fixtures, and Accumulated depreciation; and
- Intangibles assets such as Patents, Goodwill, Franchises, and Trademarks.

Conversely, the other side of the financial sheet represents the company's various liabilities, including

- Current Liabilities such as Accounts payable, Deferred revenues, Current-portion of long-term debt, and Income taxes payable;
- Long-term Liabilities including Pension liabilities, Bonds payable, Notes payable, Deferred tax liability; and
- Shareholders' Equity including Common stock (at par), Additional paid-in capital, Preferred stock, and Retained earnings.

Continuing with the financial statement, it generally includes an income statement (graphically depicted as income statement 20 in FIG. 1A) that shows the income generated and the costs incurred over a period of time, such as a financial year. As depicted in FIG. 1A, aspects of the income statement 20 include:

- Cash and credit sales;
- the Cost of Goods Sold including costs for raw materials, Direct labor, Factory overhead (including production depreciation),and Freight-in;
- Selling, General, and Administrative costs such as Non-production salaries (marketing, sales, accounting, etc.), and Amortization;
- Miscellaneous costs such as freight-out, Advertising/marketing expenses, and Non-production depreciation;
- Non-operating expenses including Income/Expense and Gain/loss associated with sale of assets other than inventory Gains/losses associated with non-operating activities;
- Interest Expenses such as Interest on debt payable and Interest on capital lease obligations; and
- Income Tax Expense including deferred tax expense and Income tax expense.

Another aspect of the company's financial statement is a Cashflow Statement (not illustrated) that is simply a statement of all the cash received or paid during the year. The Cashflow Statement includes various data including:

- Changes in Cash and Cash Equivalents for the Period describing Cash Flows from Operating Activities, Investing Activities, and Financing Activities adjusted for Cash Outflows;
- Net cash provided by operating activities such as Net income, Depreciation and amortization, Deferred income taxes, Equity income or loss, net of dividends, Foreign currency adjustments, Gains on sales of assets, and Net change in operating assets and liabilities;
- Net cash used in investing activities such as Acquisitions and investments, purchases of investments and other assets, proceeds from disposals of investments and other assets, Purchases of property, plant and equipment, and Proceeds from disposals of property, plant and equipment;
- Financing Activities such as Issuances of debt, Payments of debt, Issuances of stock, Purchases of stock for treasury, and Dividends;

The Effect of Exchange Rate Changes on Cash and Cash Equivalents; and

Cash and Cash Equivalents Balance at end of year, specifically, Net increase (decrease) during the year, and Balance at beginning of the year.

Another integral part of the company's financial statement is a section of Notes to the Accounts where all the small print is found. The Notes to the Accounts contain valuable information on the following:

Accounting conventions used;
Fair value of assets (marketable securities, fixed assets, equity investments, intangible assets);
Details of liabilities (type and term of debt);
Segment data (geographic, product, divisional);
Details of shares and new issuance;
Details of pension liabilities;
Details of Employee Stock Option Plans (ESOP's); and
Off-balance sheet liabilities (leases, derivatives).

As suggested in the accounting breakdown 20, the ROI tool 10 is operates by collecting data about the organization and applying an algorithm to predict changes to the collected values. The predictive algorithm is generally specific to a particular product because it is difficult to predict changes from multiple sources. Furthermore, the ROI tools tend to be proprietary selling tools that allows a vender to create a business case scenarios for customers. A ROI tool used by one vender is based on specific assumptions that differ from ROI tools created by other venders.

Figure 2A:
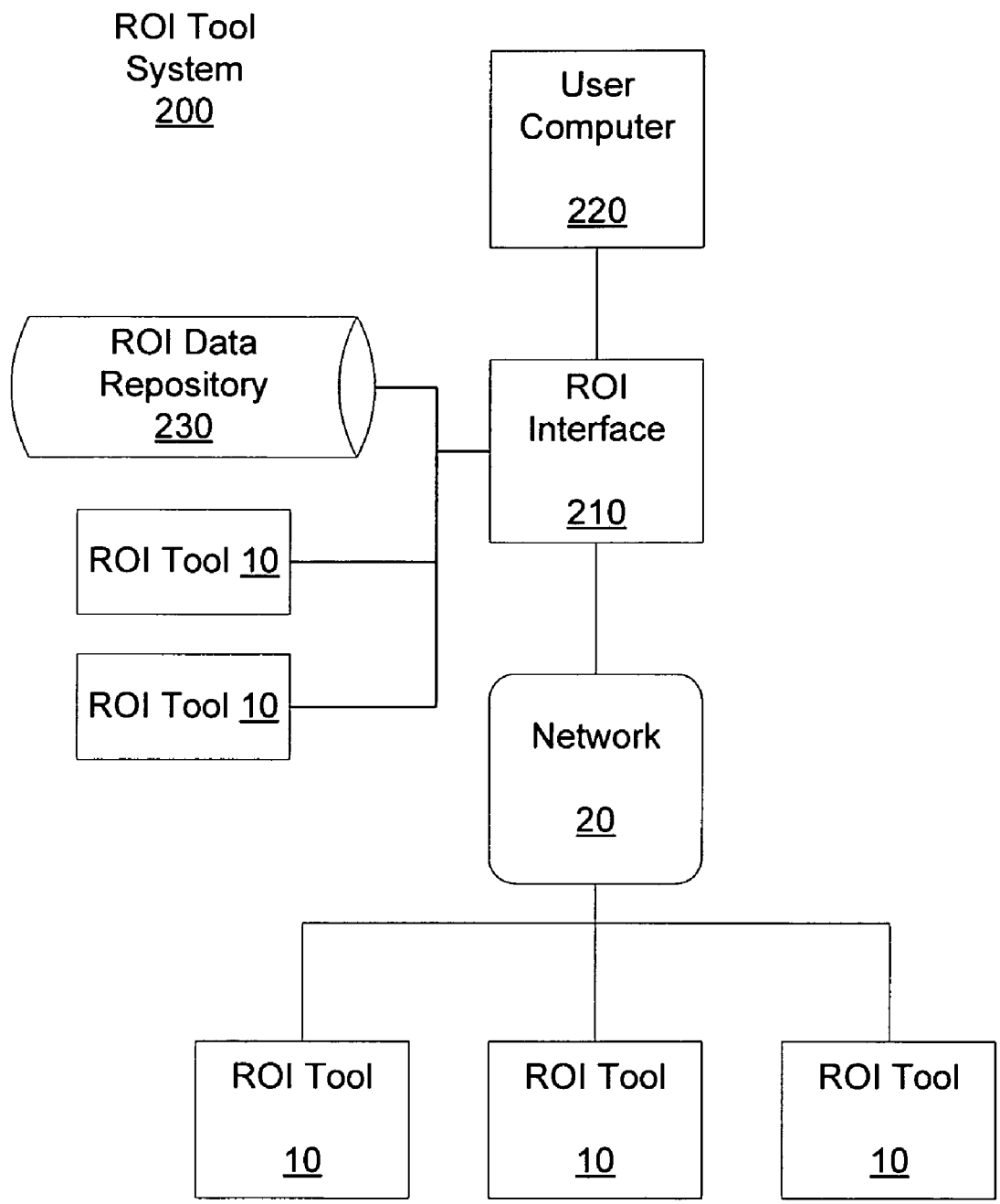
FIGS. 2A-2B schematically depict various elements in a ROI tool in accordance with embodiments of the present invention.

Turning now to FIG. 2A., the present invention provides a system 200 for using existing ROI tools to predict the results from a complex technology expenditure (i.e., an expenditure that is not easily evaluated using a single ROI tool 10) For example, an expenditure involving multiple products and services is difficult to evaluate with a single ROI tool. Returning now to FIG. 2A, the ROI interface system 200 In response to these generally includes an ROI interface 210 that requests and accepts user input from a user 220. The ROI interface than stores and uses the user input to access a ROI repository 230 containing multiple ROI tools 10. The ROI interface 210 uses the user data to select appropriate ROI tools 10. The user interface 210 obtains data from the ROI data repository to prompt the user 220 for additional data as needed by the selected ROI tools 10. The additional data is then provided to the selected ROI tools 10 to produce a composite accounting breakdown.

Continuing with FIG. 2A, the ROI tools may be optionally located at a distance and accessed through a known distributed network 20, such as the Internet. For example, the users inputs collected by the ROI interface 210 may be used to select products associated with various vendors, and the ROI tool associated with these products may be accessed remotely. Likewise, locally stored ROI tools 10 may be combines with remotely accessed ROI tools 10 in order to allow the system 200 to perform more robustly and to evolve as new ROI tools are needed and added.

The user generally interfaces with the ROI tool 200 through a user computer 220 that receives data from the ROI interface to create a display prompting the user for data. The user computer 220 further includes some type of input means, such as a keyboard or mouse, that allows the user provide the requested data. Preferable, the user computer 220 contains a data repository (not displayed) containing stored financial data on the organization or is equipped to accessed such stored data on a connected storage device in response to prompts from the ROI interface. In this way, stored data from the various data repositories may be automatically accessed and used as needed for the ROI tools 10 to evaluate the proposed technology purchase.

Figure 2B:
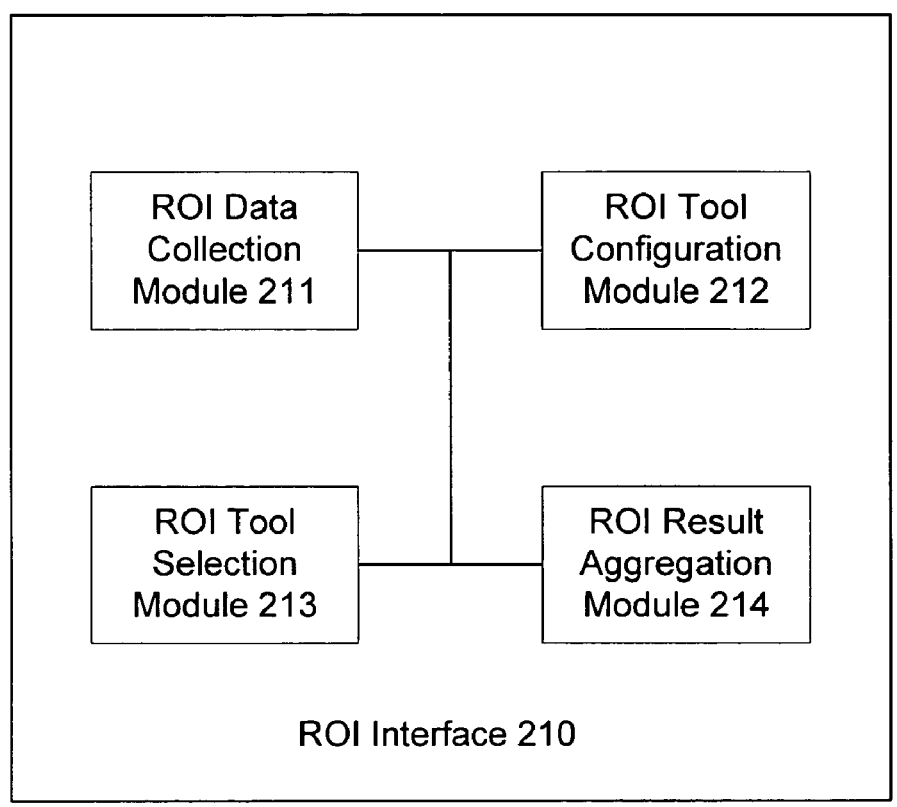

Referring now to FIG. 2B, the ROI interface 210 is described in greater detail. The ROI interface 210 is generally an application written to prefer a series of steps as needed to collect data, to provide this data to one or more ROI tools 10, and to then process the results produced by the ROI tools 10. The ROI interface includes a ROI data collection module 211 that initially collects general data from the user as needed to select and configure the applicable ROI tools. The ROI data collection module 211 generally includes some type of stored questions that may be presented to the user. For example, the ROI data collection module 211 may be a collection HTML pages that are served to the user's computer 220, that includes a web browser to display the pages and to accept the user's response. The response is then returned to the ROI interface. The ROI data collection module 211 may operate in a pre-specified fashion, walking the user through a predefined series of question. Alternatively, the ROI data collection module 211 can operate dynamically, where an answer to one question lead to the selection of a subsequent question.

In another embodiment, the ROI data collection module 211may be connected to a financial data repository via a distributed network, such as the Internet. The financial data repository may be the EDGAR website administered by the United States Security and Exchange Committee, commercial services such as Standard and Poor's Compustat database at www.Compustat.com or Thomson Financial's Global Access database at www.Primark.com, or other publicly accessible source of financial data. For instance, the ROI data collection module 211 may include software application such as data mining applications in Extended Meta Language (XML), not depicted, that automatically search for and return relevant information from a financial data repository.

The collected data lead a ROI tool selection module 213 in the ROI interface 210 to select applicable ROI tools 10. The questions from the ROI data collection module 211 generally address features of the organizations and the technology expenditure, and these product and organization features are used to select applicable ROI tools. The ROI tool selection module 213 generally includes some type of Boolean logic statement that evaluates the users answer to select an ROI tool 10. For example, a evaluation of technology expenditure involving several types of hardware, software, technical training, and a separate ROI tool may be associated with each type of technology expenditure.

The selected ROI tools designated by the ROI tool selection module 213 then accessed from the ROI data repository 230 and then configured by a ROI tool configuration module 212. Specifically, the ROI tool configuration module 212 provides the users answers to the ROI tools 10. Where additional data is needed, the ROI tool configuration module 212 then prompts the a ROI data collection module 211 to present additional questions to the user, as needed by the selected ROI tools 10. For example, the ROI data collection module 211 may be preprogrammed with a series of additional questions, and the ROI tool configuration module 212 determines which of the questions need to be answered for the selected ROI tools 10.

Once sufficient data is collected, the ROI tools 10 produce various results that are analyzed by an ROI aggregation module 214. The ROI aggregation module 214 generally includes an instruction set to pre-specifies how to combine the results of the various ROI tools. The instruction set is generally based on empirical studies evaluating the co-performance of the different ROI tools. For example, the instruction set may define when to results from two ROI tools should be summed, subtracted, averaged, combined in various ratios, etc. The instruction set may further include general instruction directing rules for deriving results from the combination of different types or classes of ROI tools. The results from the selected ROI tools 10, as aggregated by the ROI aggregation module 214, are then presented to the user.

Figure 3:
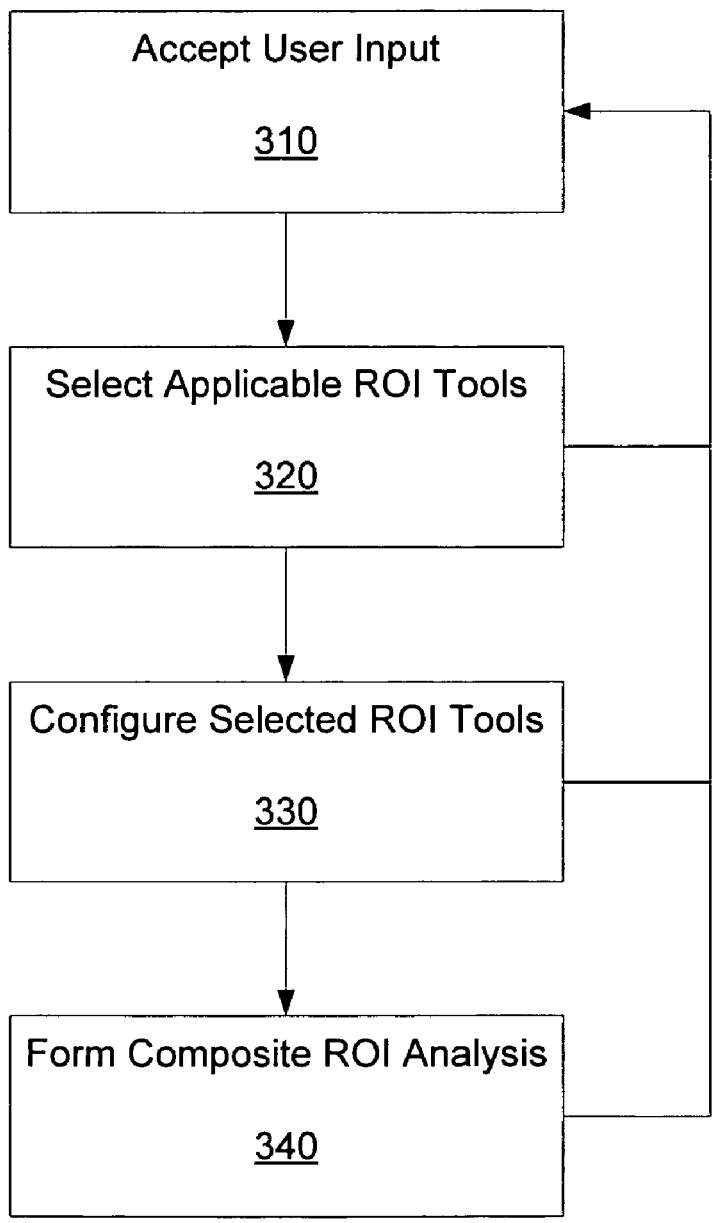
FIG. 3 depicts the steps in a relates ROI method in accordance with an embodiment of the present invention.

Referring now to FIG. 3, a related composite ROI method 300 is now provided. The ROI method 300 generally includes the steps of collecting user inputs in step 310, selecting the applicable ROI tools in step 320, configuring the selected ROI tools in step 330, and forming a composite ROI analysis in step 340. As described above in the discussion of the ROI tool system 200, the user may provide various data inputs as needed for ROI analysis. Typically, the user is prompted for data through a series of question, as needed to obtain the data needed for the ROI tools. Instead of providing data, the user may also merely indicate where the desired data is located, as well as providing information on the nature of the stored information, as needed by ROI tool.

The appropriate ROI tools are selected in step 320 based upon the user's inputs collected in step 310. The ROI tools are selected according to the information provided about the organization and the proposed expenditures, since the ROI tools are generally specifically configured for different product and different purchasers. It is possible that only one ROI tool is applicable, and in this case, the formation of the composite ROI analysis in step 340 is mute.

In step 330, the selected ROI are configured as needed to perform an analysis of the proposed purchase. Typically, the users' inputs from step 310 are analyzed by the selected ROI tools. Furthermore, there may be logic to subdivide the technology expenditure and to allocate the portions of the technology expenditure to applicable ROI tools associated with each type of expenditure. For example, some type of preprogrammed logic may define the division of the expenditure, and the association of the various ROI tools with the different expenditure divisions.

In step 340, results from the different ROI tools are combined according to prespecified combination rules. For example, the results may be weighted and summed. The combination rules are generally formed through empirical studies of prior purchasers. Where a particular ROI tool has not been studied, the results from similar studied ROI tools may be used to form a guess for combining the results from the different ROI tools. The composite results from step 340 are then presented to user and may be used to guide the user to achieve the predicted results.

Continuing with FIG. 3, it should be appreciated that the process may be iterative so that additional data may be collected from the user at anytime. The additional data may be needed to complete the steps of the ROI composite method 300. For example, additional data may be collected from the user as needed to select or configure the ROI tools. Similarly, the user may provide additional or amended data, and note the resulting changes from the new data. This feature provides powerful functionality whereby a user can provide rough estimates to quickly estimate benefits and then provide exact data to form a more accurate estimate. This feature further allows a user to evaluate the technology expenditure in view of various changes, so that the user can better evaluate the accuracy and sensitivity of the estimate.

Conclusion

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A computer-based system for automated evaluation of a technology expenditure by an organization, the system comprising:
    a ROI data repository containing a plurality of ROI tools for calculating results comprising expected costs and benefits for the technology expenditure based on data about the technology expenditure and the organization; and
    a processor and memory linked to the ROI data repository and configured to execute an application, the application comprising:
        a data collection module for obtaining data about the technology expenditure and the organization;
        a selection module having predefined logic to analyze said data about the technology expenditure and the organization obtained by the data collection module and to select two or more of said plurality of ROI tools from the ROI data repository based on the analyzed data;
        a configuration module for providing the data about the technology expenditure and the organization obtained by the data collection module to two or more selected ROI tools, whereby the data provided is used by the at least two selected ROI tools to calculate results comprising expected costs and benefits for the technology expenditure; and
        an aggregation module for receiving the results from the at least two selected ROI tools and combining the results according to predefined result combination rules, wherein the predefined result combination rules are included in the aggregation module.

2. The automated technology expenditure evaluation system of claim 1 further comprising a communication means for receiving said data.

3. The automated technology expenditure evaluation system of claim 2, wherein said communication means is configured for accessing remotely stored financial information on the organization.

4. The automated technology expenditure evaluation system of claim 3, wherein the data collection module further comprises an automated data collection application.

5. The automated technology expenditure evaluation system of claim 1 further comprising a communication means configured for accessing a remotely stored ROI tool.

6. The automated technology expenditure evaluation system of claim 1 further comprising a data storage means for storing said combined results from said at least two selected ROI tools, whereby said stored results are compared with results from a different iteration of the automated technology expenditure evaluation system.

7. The automated technology expenditure evaluation system of claim 1, wherein each of the stored ROI tools provide a cost benefit analysis for a type of proposed technology expenditure.

8. The automated technology expenditure evaluation system of claim 1, wherein the data collection module for obtaining data about the expenditure and the organization is configured to present one or more questions and to accept answers to said one or more questions.

9. The automated technology expenditure evaluation system of claim 1, wherein the configuration module prompts the data collection module for additional data needed by said at least two selected ROI tools.

10. A method to automated evaluate a technology expenditure by an organization, the method comprising the steps:
   a computer accepting data about the technology expenditure and the organization;
   said computer selecting two or more ROI tools based on said data about the technology expenditure and the organization from a plurality of stored ROI tools stored in a ROI data repository;
   said computer acquiring said two or more selected ROI tools from said ROI data repository and configuring said two or more selected ROI tools using said data about the technology expenditure and the organization;
   said two or more selected ROI tools calculating results comprising expected costs and benefits for the technology expenditure;
   and said computer forming a composite analysis combining the results of the two or more selected ROI tools according to predefined combination rules, wherein the predefined combination rules are stored by the computer.

11. The automated technology expenditure evaluation method of claim 10, wherein the data is a first data and the composite analysis is a first analysis, and the method further comprises the steps of:
   the computer accepting second data about the expenditure and the organization;
   said computer processing said second data to select two or more ROI tools from a plurality of stored ROI tools according to predefined selection rules;
   said computer configuring said two or more selected ROI tools using said second data;
   said computer forming a second composite analysis combining results of the two or more selected ROI tools according to predefined combination rules; and
   said computer comparing said first and said second composite analyses.

12. The automated technology expenditure evaluation method of claim 10, wherein the step of said computer configuring said two or more selected ROI tools using said data further comprises the computer accepting additional data about the expenditure and the organization.

13. The automated technology expenditure evaluation method of claim 10, wherein the step of the computer accepting data about the expenditure and the organization further comprises presenting one or more questions to said user and accepting the user's response to said questions.

14. The automated technology expenditure evaluation method of claim 10, wherein said step of the computer accepting data about the expenditure and the organization further comprises accessing remotely stored financial information on the organization.

15. The automated technology expenditure evaluation method of claim 14, wherein said step of the computer accepting data about the expenditure and the organization further comprises an automated data collection application automatically accessing the remotely stored financial information on the organization.

16. The automated technology expenditure evaluation method of claim 10, wherein said step of the computer acquiring and configuring said two or more selected ROI tools using said data further comprises accessing a remotely stored ROI tool.

17. A computer readable medium for evaluating a technology expenditure by an organization, the computer readable medium having executable instructions which when executed cause a computer to perform steps comprising:
   accepting data about the technology expenditure and the organization;
   selecting two or more ROI tools based on said data about the technology expenditure and the organization from a plurality of stored ROI tools stored in a ROI data repository;
   acquiring said two or more selected ROI tools from said ROI data repository and configuring said two or more selected ROI tools using said data about the technology expenditure and the organization;
   calculating results using said ROI tools, the results comprising expected costs and benefits for the technology expenditure;
   and forming a composite analysis combining the results of the two or more selected ROI tools according to predefined combination rules, wherein the predefined combination rules are stored by the computer.

18. The computer-readable storage medium of claim 17 wherein the step of accepting data about the expenditure and the organization further comprises presenting one or more questions to said user and accepting the user's response to said questions.

19. The computer-readable storage medium of claim 17 wherein the step of accepting data about the expenditure and the organization further comprises accessing remotely stored financial information on the organization.

20. The computer-readable storage medium of claim 17 wherein the step of accepting data about the expenditure and the organization further comprises an automated data collection application automatically accessing the remotely stored financial information on the organization.

21. The computer-readable storage medium of claim 17 wherein the step of acquiring and configuring said two or more selected ROI tools using said data further comprises accessing a remotely stored ROI tool.

* * * * *